(No Model.)
E. KRIPPENDORFF & J. COCHRAN.
TEA AND COFFEE POT.
No. 309,788. Patented Dec. 23, 1884.
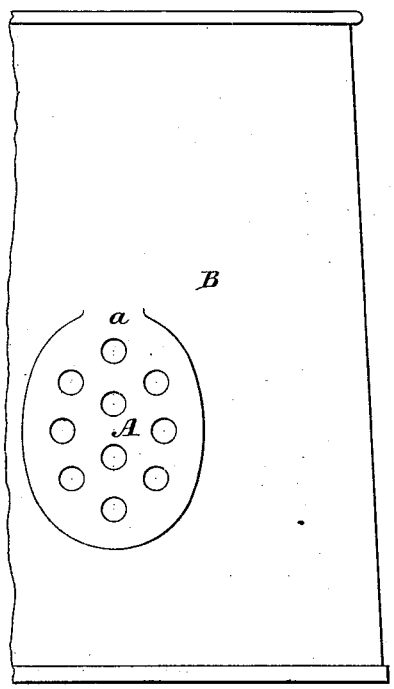
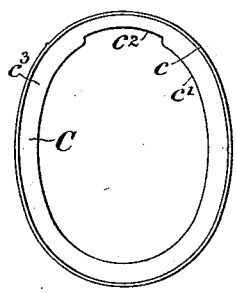
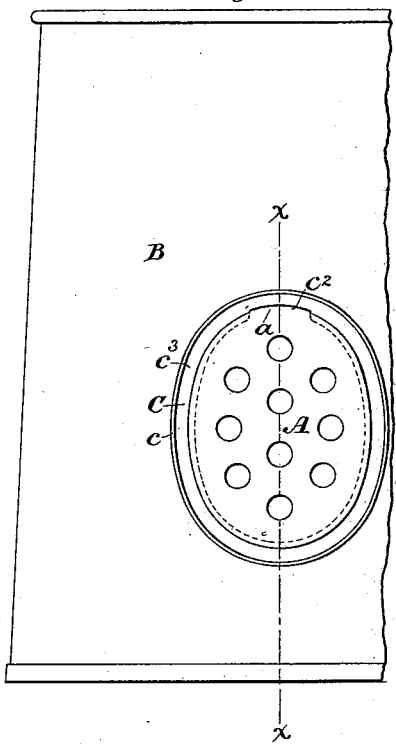
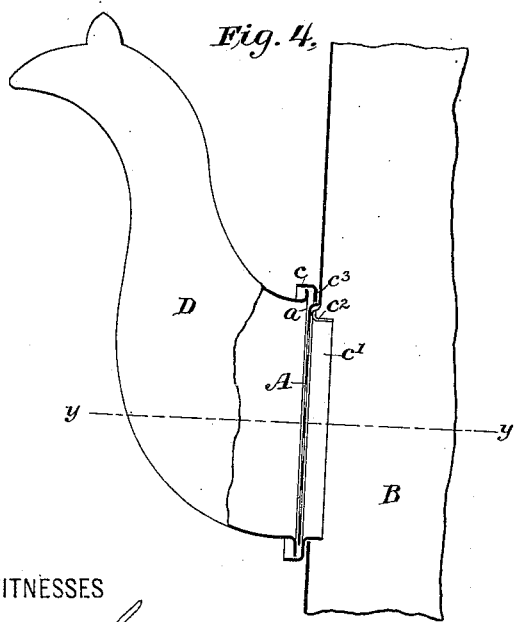
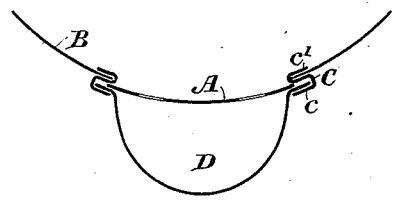
WITNESSES
Wm A. Skinkle
Jos. S. Latimer
INVENTORS
Emile Krippendorff
James Cochran,
By their Attorneys,
Pope Edgecomb & Butler

UNITED STATES PATENT OFFICE.

EMILE KRIPPENDORFF, OF WOODHAVEN, AND JAMES COCHRAN, OF NEW LOTS, NEW YORK, ASSIGNORS TO THE LALANCE & GROSJEAN MANUFACTURING COMPANY, OF NEW YORK, N. Y.

TEA AND COFFEE POT.

SPECIFICATION forming part of Letters Patent No. 309,788, dated December 23, 1884.

Application filed September 5, 1883. (No model.)

*To all whom it may concern:*

Be it known that we, EMILE KRIPPENDORFF and JAMES COCHRAN, citizens of the United States, residing, respectively, in Woodhaven, in the county of Queens, and in New Lots, in the county of Kings, and State of New York, have jointly invented certain new and useful Improvements in Tea and Coffee Pots, of which the following is a specification.

Our invention relates to the joints of attachment of the spout, body, and strainer of tea and coffee pots in which the parts are secured together by flanged collars, the flanges of which act to clamp corresponding flanges formed upon the base of the spout and the edge of the orifice in the wall of the vessel where the spout is attached. A joint embodying these features is exhibited in Letters Patent of the United States No. 260,995, granted to Emile Krippendorff, July 11, 1882.

In United States Letters Patent granted May 1, 1883, to the same person, and numbered 276,976, means are set forth for attaching a V-shaped lip to the body of a vessel by means of corrugations formed upon the edge of the lip, which corrugations are caused to embrace the free edges of a strainer of corresponding V shape. This strainer is formed integral with the body of the vessel, and is but partially separated therefrom, its upper edge being left uncut. The corrugations upon the edge of the lip serve, when compressed, to unite the lip, strainer, and vessel together.

The object of our present invention is to provide means for applying the partially-separated strainer hereinbefore referred to to an ordinary spout having a base of oval or circular cross-section, which we accomplish by a certain change in the construction of the double-flanged encircling-collar, thus combining in a new and useful form the several inventions set forth in the Letters Patent aforesaid.

In the accompanying drawings, which illustrate our invention, Figures 1, 2, and 3 are views in elevation, showing, respectively, one form of a strainer as struck out or partly severed from the wall of the vessel, the encircling-collar, and said collar in place upon the vessel before the attachment of the spout. Fig. 4 is a transverse vertical section on the line $x\ x$, and Fig. 5 is a plan section on the line $y\ y$ of the different parts, with the partially-separated strainer, assembled.

Similar letters appearing in different figures indicate like parts.

Referring first to Fig. 1, A is a strainer formed from the wall of the vessel, being severed therefrom at every point except at the point $a$, which latter constitutes a neck uniting the strainer with the body. The edge of the body B adjacent to that of the strainer A may preferably be contracted, causing the strainer to be slightly sprung outward from the body B. C is a collar, (best shown in Fig. 2,) and is provided with flanges $c$ and $c'$, which, when the collar is in place upon the body B, as illustrated in Fig. 4, respectively project outwardly from the vessel and into the interior thereof. The flange $c'$ is cut away at the point marked $c^2$ for a distance corresponding to the breadth of the neck $a$, for the purpose of allowing the main or flat portion of the collar to rest against the body of the vessel. The collar is put in place by inserting the flange $c'$ between the strainer A and the adjacent edges of the body of the vessel. The spout D, Fig. 4, is formed with a laterally-projecting flange surrounding its base, and this flange is placed against the main portion $c^3$ of the collar C, as shown in Fig. 4. The parts being thus assembled, the flanges $c$ and $c'$ are bent down into the respective positions shown in Fig. 5. The flanges are then further compressed by means of a die or otherwise, so as to securely clamp the parts together.

The advantages of the separate collar in the manufacture of these articles are, among others, a more perfect joint can be formed with it, and the body of the vessel may be made of a cheaper quality of iron and yet be equally as serviceable. In order to form the sharply-turned and compressed flanges, very ductile and therefore comparatively expensive metal is required. The separate collar only, which is small, need be of the more expensive material, thereby reducing the cost, of the vessel. Again, the flanges can be more easily formed upon the collar than upon the vessel or spout, because the collar is a small piece and can be more easily and cheaply manipulated.

We are aware that the body and spout have been united by means of a double-flanged collar extending within and without the walls of the vessel, in combination with a strainer formed from a separate piece of metal, and we make no claim thereto.

We claim as our invention—

The combination, with the body of a tea or coffee pot or other like vessel, a strainer forming an integral part of the wall of said vessel, being partially separated therefrom, and a spout the base of which is of oval or circular cross-section, and is provided with a surrounding and laterally-projecting flange, of a separate double-flanged collar encircling the base of said spout and uniting it with the body of the vessel, substantially as set forth.

In testimony whereof we have hereunto subscribed our names this 3d day of September, A. D. 1883.

EMILE KRIPPENDORFF.
JAMES COCHRAN.

Witnesses:
CHAS. DOUGHTY,
ALFRED D. KELLER.